(12) United States Patent
Yamamoto et al.

(10) Patent No.: US 10,996,550 B2
(45) Date of Patent: May 4, 2021

(54) TRANSPARENT SCREEN HAVING CHOLESTERIC LIQUID CRYSTAL LAYER, AND TRANSPARENT SCREEN SYSTEM

(71) Applicant: FUJIFILM Corporation, Tokyo (JP)

(72) Inventors: Akira Yamamoto, Minami-ashigara (JP); Hideki Kaneiwa, Minami-ashigara (JP); Yujiro Yanai, Minami-ashigara (JP); Michio Nagai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/571,972

(22) Filed: Sep. 16, 2019

(65) Prior Publication Data
US 2020/0012181 A1 Jan. 9, 2020

Related U.S. Application Data

(63) Continuation of application No. PCT/JP2018/010888, filed on Mar. 19, 2018.

(30) Foreign Application Priority Data

Mar. 17, 2017 (JP) .............................. JP2017-053412

(51) Int. Cl.
*G03B 21/62* (2014.01)
*G03B 21/60* (2014.01)
(Continued)

(52) U.S. Cl.
CPC ............. *G03B 21/62* (2013.01); *G03B 21/60* (2013.01); *G02B 5/3016* (2013.01); *G02B 27/0977* (2013.01)

(58) Field of Classification Search
CPC ...... G03B 21/56; G03B 21/216; G03B 21/62; G02B 5/3016; G02B 27/0977
See application file for complete search history.

(56) References Cited

U.S. PATENT DOCUMENTS

| | | | |
|---|---|---|---|
| 7,936,507 B2 * | 5/2011 | Sano | G03B 21/56 359/459 |
| 2006/0181769 A1 * | 8/2006 | Kumasawa | G03B 21/62 359/449 |

(Continued)

FOREIGN PATENT DOCUMENTS

| | | |
|---|---|---|
| JP | 2006-337944 A | 12/2006 |
| JP | 2008-65022 A | 3/2008 |

(Continued)

OTHER PUBLICATIONS

Japanese Office action, dated Jul. 7, 2020, for corresponding Japanese Application No. 2019-506328, with an English translation.

(Continued)

*Primary Examiner* — Christopher E Mahoney
(74) *Attorney, Agent, or Firm* — Birch, Stewart, Kolasch & Birch, LLP (57) ABSTRACT

The present invention provides a transparent screen which is excellent in transparency and in which a reflection part contour at the time of not displaying an image is unlikely to be recognized. An optical sheet of the present invention includes a substrate; and a cholesteric liquid crystal layer on the substrate, in which the entire cholesteric liquid crystal layer is surrounded by an imaginary contour line, the cholesteric liquid crystal layer has a uniform region and a modulation region that is located between the uniform region and at least a part of the imaginary contour line, a shortest distance between the imaginary contour line and the uniform region is 10 mm or longer, and a reflectance of the modulation region monotonously decreases from the uniform region side toward the imaginary contour line side.

4 Claims, 1 Drawing Sheet

(51) Int. Cl.
  *G02B 5/30*    (2006.01)
  *G02B 27/09*   (2006.01)

(56)          References Cited

U.S. PATENT DOCUMENTS

2009/0168143 A1    7/2009   Wen et al.
2016/0124295 A1*   5/2016   Montgomery ......... G02B 13/16
                                                        353/10
2017/0082915 A1*   3/2017   Tao ......................... G02B 5/08
2017/0343830 A1   11/2017   Nagai et al.
2018/0292582 A1   10/2018   Matsuo et al.

FOREIGN PATENT DOCUMENTS

WO    WO 2012/114512 A1    8/2012
WO    WO 2016/104112 A1    6/2016
WO    WO 2016/133223 A1    8/2016

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/010888, dated Sep. 26, 2019.
International Search Report (Form PCT/ISA/210) for International Application No. PCT/JP2018/010888, dated May 29, 2018, with English translation.

\* cited by examiner

TRANSPARENT SCREEN HAVING CHOLESTERIC LIQUID CRYSTAL LAYER, AND TRANSPARENT SCREEN SYSTEM

CROSS-REFERENCE TO RELATED APPLICATIONS

This application is a Continuation of PCT International Application No. PCT/JP2018/010888 filed on Mar. 19, 2018, which claims priority under 35 U.S.C. § 119(a) to Japanese Patent Application No. 2017-053412 filed on Mar. 17, 2017. The above application is hereby expressly incorporated by reference, in its entirety, into the present application.

BACKGROUND OF THE INVENTION

1. Field of the Invention

The present invention relates to a transparent screen having a cholesteric liquid crystal layer, and a transparent screen system using the same.

2. Description of the Related Art

In recent years, transparent screens in which light from the front surface side is reflected and light from the back surface side is transmitted, have been proposed as one of display devices.

For example, JP2006-337944A describes a semi-transmissive type reflective screen including a base material layer that is capable of transmitting light and is formed into an approximately flat parallel plate; a plurality of unit shapes capable of transmitting light, which protrudes on the back surface side of the base material layer, which is an opposite side of the video source side, and are one-dimensionally or two-dimensionally arranged in a row along a screen surface; and a reflective layer that is provided at the apex of the back surface side of the unit shapes and reflects the video light that has been transmitted through the unit shapes, in which the unit shapes are arranged with gaps therebetween, and in the space between the unit shapes are arranged, a background transmission unit is provided in a state where the base material layer or a flat surface parallel to the base material layer is exposed. This semi-transmissive type reflective screen is a screen with which the background on the back surface side can be observed from the front, while the video light from the front is reflected by means of a reflective surface and is made observable.

SUMMARY OF THE INVENTION

Because of characteristics in which light from a front side of a transparent screen is reflected, and light from a back side is transmitted, the transparent screen functions as an ambient display when installed on a wall, a window, a desk, or the like. The term "ambient" includes a meaning such as "surroundings or environmental."

The above-mentioned transparent screen can be used as an ambient display that blends in with the environment, but there is a problem of this "ambient" property being impaired in a case where a user recognizes a contour of a part for reflecting front side light at the time of not displaying an image.

In view of the above situation, an object of the present invention is to provide a transparent screen which is excellent in transparency and in which a reflection part contour at the time of not displaying an image is unlikely to be recognized.

The inventors of the present invention have found that the above-mentioned object can be achieved by the following aspects.

[1] A transparent screen comprising: a substrate; and a cholesteric liquid crystal layer on the substrate, in which the entire cholesteric liquid crystal layer is surrounded by an imaginary contour line, the cholesteric liquid crystal layer has a uniform region and a modulation region that is located between the uniform region and at least a part of the imaginary contour line, a shortest distance between the imaginary contour line and the uniform region is 10 mm or longer, and a reflectance of the modulation region monotonously decreases from the uniform region side toward the imaginary contour line side.

[2] A transparent screen comprising: a substrate; a wavelength selective reflection layer; a uniform region and a transparent region in a plane; and a modulation region that is located between the uniform region and the transparent region, in which a reflectance of the transparent region is smaller than a reflectance of the uniform region, a reflectance of the modulation region is between the reflectance of the uniform region and the reflectance of the transparent region, and decreases from the uniform region side toward the transparent region in the plane, and a width of the modulation region is 10 mm or more.

[3] The transparent screen according to [2], in which the reflectance of the uniform region in a visual light range is more than 10%, and the reflectance of the transparent region in a visual light range is 10% or less.

[4] The transparent screen according to [2] or [3], in which the uniform region is surrounded by the modulation region or an end portion of the transparent screen.

[5] The transparent screen according to [2] or [3], in which the uniform region is surrounded by the modulation region.

[6] The transparent screen according to any one of [2] to [5], in which the wavelength selective reflection layer includes a cholesteric liquid crystal layer.

[7] The transparent screen according to [1] or [6], in which, in the uniform region and the modulation region, the cholesteric liquid crystal layer is distributed in a dot shape on the substrate, and in the modulation region, a distribution density of the cholesteric liquid crystal layer is reduced in a decrease direction of the reflectance.

[8] The transparent screen according to [1] or [6], in which the uniform region and the modulation region have the cholesteric liquid crystal layer on the entire surface thereof, and in the modulation region, a film thickness is reduced in a decrease direction of the reflectance.

[9] The transparent screen according to [1] or [6], in which the uniform region has the cholesteric liquid crystal layer on the entire surface thereof, the modulation region includes a liquid crystalline compound, the liquid crystalline compound has, in a pattern shape, portions that are fixed in a cholesteric phase and portions that are fixed in a phase other than the cholesteric phase, and a proportion of the portions that are fixed in a phase other than the cholesteric phase increases in a decrease direction of the reflectance.

[10] The transparent screen according to [1] or [6], in which the uniform region and the modulation region have the cholesteric liquid crystal layer on the entire surface thereof, and in the modulation region, a chiral pitch of the cholesteric liquid crystal layer increases in a decrease direction of the reflectance.

[11] The transparent screen according to [1] or [6], in which the uniform region and the modulation region have the cholesteric liquid crystal layer on the entire surface thereof, and in the modulation region, a chiral pitch of the cholesteric liquid crystal layer decreases in a decrease direction of the reflectance.

[12] A transparent screen system comprising: the transparent screen according to any one of claims 1 to 11; and an image projection device.

According to the present invention, it is possible to provide a transparent screen which is excellent in transparency and in which a reflection part contour at the time of not displaying an image is unlikely to be recognized.

BRIEF DESCRIPTION OF THE DRAWINGS

FIG. 1 is a schematic cross-sectional view showing an example of an embodiment of a transparent screen of the present invention.

FIG. 2 is a schematic top view showing an example of an embodiment of a transparent screen of the present invention.

DESCRIPTION OF THE PREFERRED EMBODIMENTS

Figure 1:
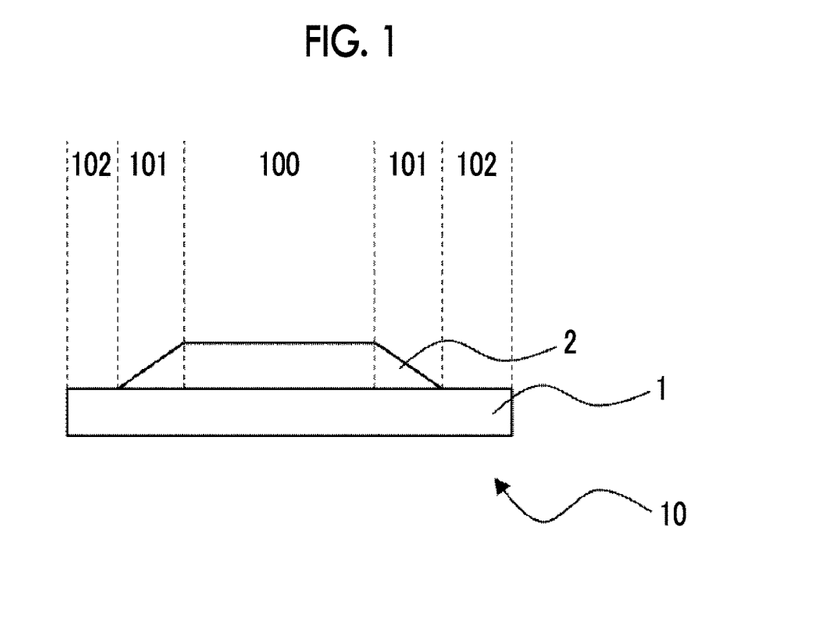
Figure 2:
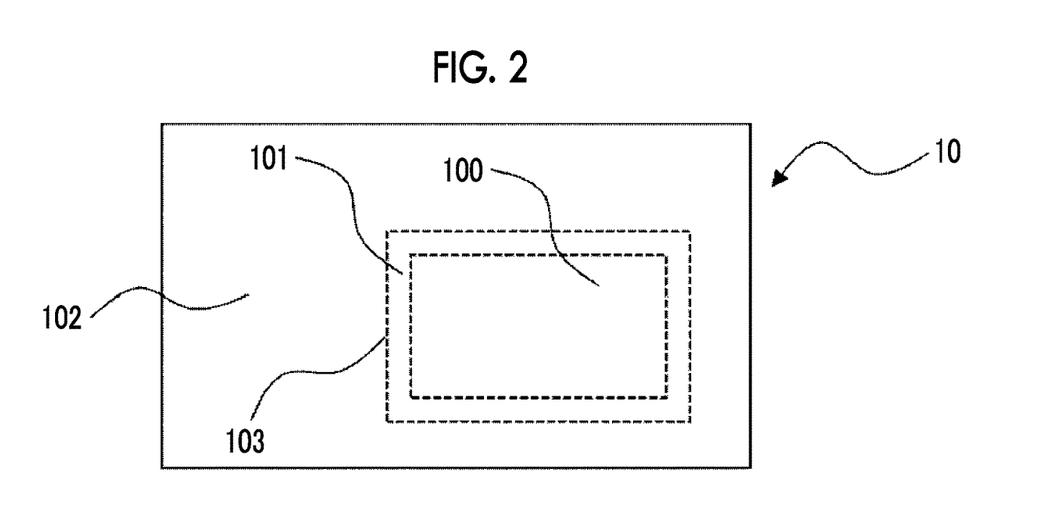

A transparent screen of the embodiment of the present invention will be explained in detail below. A numerical value range represented by using "to" in the present specification means a range including the numerical values described before and after "to" as the lower limit and the upper limit, respectively.

According to the present specification, for example, an angle such as "45°," "parallel," "perpendicular," or "orthogonal" means that unless particularly stated otherwise, the difference between the angle and the exact angle is in the range of smaller than 5 degrees. The difference between the angle and the exact angle is preferably smaller than 4 degrees, and more preferably smaller than 3 degrees.

According to the present specification, the term "(meth)acrylate" is used to mean "any one or both of acrylate and methacrylate."

According to the present specification, the term "same" is meant to include an error range that is generally tolerable in the technical field. According to the present specification, in a case where it is said "entirety," "all," or "entire surface," the terms are meant to include error ranges that are generally tolerable in the technical field, in addition to the case of being 100%, and to include the cases of, for example, 99% or more, 95% or more, or 90% or more.

Visible light is light having wavelengths that can be seen by human eyes among the electromagnetic waves and indicates light in the wavelength region of 380 nm to 780 nm. Non-visible light is light in the wavelength region of shorter than 380 nm or in the wavelength region of longer than 780 nm.

Without being limited to this, light in the wavelength region of 420 nm to 495 nm in the visible light is blue light, light in the wavelength region of 495 nm to 570 nm is green light, and light in the wavelength region of 620 nm to 750 nm is red light.

In the infrared light, near-infrared light is an electromagnetic wave in the wavelength region of 780 nm to 2,500 nm. Ultraviolet light is light in the wavelength region of 10 to 380 nm.

In the present specification, a case in which a reflectance in a visual light range is referred to represents a visibility-corrected reflectance in a wavelength region of 380 nm to 780 nm.

Recursive reflection according to the present specification means reflection by which incident light is reflected in the direction of incidence.

According to the present specification, the term "haze" means a value measured using a haze meter, NDH-2000, manufactured by Nippon Denshoku Industries Co., Ltd.

Theoretically, the haze means a value represented by the following expression.

(Scattering transmittance of natural light at 380 to 780 nm)/(scattering transmittance of natural light at 380 to 780 nm+direct transmittance of natural light)×100%

The scattering transmittance is a value that can be calculated by subtracting the direct transmittance from the omnidirectional transmittance obtainable by using a spectrophotometer and an integrating sphere unit. The direct transmittance in the case based on the value measured using an integrating sphere unit is transmittance at 0°. That is, a low haze means that an amount of directly transmitted light is large among a total amount of transmitted light.

A refractive index is a refractive index with respect to light having a wavelength of 589.3 nm.

<Transparent Screen>

A first embodiment of the transparent screen of the present invention is a transparent screen including a substrate; and a cholesteric liquid crystal layer on the substrate, in which the entire cholesteric liquid crystal layer is surrounded by an imaginary contour line, the cholesteric liquid crystal layer has a uniform region and a modulation region that is located between the uniform region and at least a part of the imaginary contour line, the shortest distance between the imaginary contour line and the uniform region is 10 mm or longer, and a reflectance of the modulation region monotonously decreases from the uniform region side toward the imaginary contour line side.

A second aspect of the transparent screen of the present invention is a transparent screen including a substrate; a wavelength selective reflection layer; a uniform region and a transparent region in a plane; and a modulation region that is located between the uniform region and the transparent region, in which a reflectance of the transparent region is smaller than a reflectance of the uniform region, a reflectance of the modulation region is between the reflectance of the uniform region and the reflectance of the transparent region, and monotonously decreases from the uniform region side toward the transparent region in the plane, and a width of the modulation region is 10 mm or more.

[Uniform Region]

The transparent screen of the embodiment of the present invention includes a uniform region in which a visibility-corrected reflectance is constant. Here, the phrase the "visibility-corrected reflectance being constant" means that a variation of the visibility-corrected reflectance is within ±1%. This can be confirmed by measuring a reflectance at 10 points or more in a plane with an aperture size of 1 mm or more.

In addition, a reflectance in a visual light range of the uniform region is preferably more than 10%.

The uniform region used in the present invention is preferably surrounded by the modulation region to be described later, and an end portion of the transparent screen. In addition, in another aspect, the uniform region is preferably surrounded by the modulation region and the transparent region. Furthermore, in still another aspect, the uniform region is preferably surrounded only by the modulation region.

[Transparent Region]

The transparent screen of the embodiment of the present invention includes a transparent region in which a transmittance in a visual light range is smaller than that in the uniform region, and a visibility-corrected reflectance is constant.

In addition, a reflectance in a visual light range of the transparent region is preferably 10% or less.

[Modulation Region]

The transparent screen of the embodiment of the present invention includes a modulation region located between the uniform region and the transparent region. In addition, in another aspect, the transparent screen includes a modulation region in which an imaginary contour line is defined and which is located between the uniform region and at least a part of the imaginary contour line. A visual action of this modulation region makes it difficult to recognize the contour.

In the present invention, a visual action is generated by a decrease in a reflectance in a visual light range of the modulation region from the uniform region side to the transparent region side or to the imaginary contour line side. The reflectance preferably decreases monotonously.

A reflectance is a reflectance that monotonously decreases in a case where there is changes in reflectance every 1 mm, that is, a case in which $R_n-R_{n+1}$ (n is an integer greater than 0) is 0% to 5% from a start point to an end point, by measuring a reflectance of a visible light wavelength with an aperture size of about 1 mm to 5 mm to obtain a visibility-corrected reflectance, and measuring a reflectance from the uniform region side toward the transparent region side or the imaginary contour line side every 1 mm. At this time, a reflectance $R_0$ (n=0) of the start point is an end portion of the uniform region close to the modulation region, and a reflectance $R_t$ (n+1=t) of the end point is an end portion the transparent region that is close to the modulation region, or is an outside of the imaginary contour line.

A monotonous decrease may be a linear decrease with respect to a measurement position or may be a non-linear decrease.

The substrate used for the transparent screen of the embodiment of the present invention may be a single substrate or a plurality of substrates. The wavelength selective reflection layer may be a single layer or a plurality of layers. A laminate in which a plurality of pairs of the substrate and the wavelength selective reflection layer are bonded may be adopted. The substrate may be transparent, opaque, colored, or black, but is preferably transparent.

The applications include an image projection screen, a transparent screen, a decorative sheet, and the like, and the substrate can be used as a sheet-like member that is directly viewed. In particular, the substrate is preferably used as a transparent screen, and is suitable for a transparent screen system combined with a device for projecting an image, such as a projector.

In the present invention, a suitable transparent screen is disclosed in detail in WO2016/133223A, and can be produced based on the description.

[Wavelength Selective Reflection Layer]

In the transparent screen of the embodiment of the present invention, a reflectance is changed according to an in-plane position by changing a state of the wavelength selective reflection layer according to the in-plane position.

The wavelength selective reflection layer used in the present invention is not particularly limited as long as it is generally used layer. The wavelength selective reflection layer preferably has a cholesteric liquid crystal layer.

The cholesteric liquid crystal layer used in the present invention is made of a liquid crystal material having a cholesteric structure or a cured product containing the structure. Furthermore, the cholesteric liquid crystal layer may be a continuous film-like substance or may be a set of dots distributed discontinuously on the substrate.

In addition, the cholesteric liquid crystal layer has a helical structure of a liquid crystal material, that is, a cholesteric structure, and exhibits selective reflectivity at a specific wavelength.

In the present invention, dots suitable as a cholesteric structure and the cholesteric liquid crystal layer are disclosed in WO 2016/133223A.

The cholesteric liquid crystal layer may be any of a single layer or a plurality of layers, and preferably has three layers having selective reflectivity for each wavelength of visible light B, G, and R. A lamination order is preferably R, G, and B from the substrate side.

In a case where the cholesteric liquid crystal layer is distributed in the form of dots on the substrate, dots having selective reflectivity for each wavelength of visible light B, G, and R may be mixed and present on the same surface of the substrate, and in this case, the cholesteric liquid crystal layer is one layer for convenience.

[Imaginary Contour Line]

In one aspect of the transparent screen of the present invention, the entire cholesteric liquid crystal layer is surrounded by an imaginary contour line.

The imaginary contour line is an imaginary contour line connecting an outer edge of the entire cholesteric liquid crystal layer in a broad sense.

The cholesteric liquid crystal layer is an imaginary line connecting an outer edge of the film in a case where the cholesteric liquid crystal layer is in a form of a continuous film, and the cholesteric liquid crystal layer is an imaginary line connecting the outermost dots as an outer edge in a case where the cholesteric liquid crystal layer is a set of dots distributed discontinuously on the substrate.

In addition, in a narrow sense, the imaginary contour line may be an imaginary contour line connecting the boundary between a portion having selective reflectivity to visible light of the entire cholesteric liquid crystal layer and a portion not having selective reflectivity thereto.

Furthermore, the shortest distance between the imaginary contour line and the uniform region is 10 mm or longer, and is preferably 20 mm or longer. The shortest distance between the imaginary contour line and the uniform region is a numerical value corresponding to an effective width of the modulation region to be described later. In a case where the shortest distance is less than 10 mm, a contour is easily recognized. An upper limit value of the shortest distance is not particularly limited, but it is preferable to set the upper limit value to about 20% of a vertical size or a horizontal size of the transparent screen from a functional viewpoint.

[Substrate]

The substrate used in the present invention functions as a substrate for forming the wavelength selective reflection layer on the surface thereof.

It is preferable that the substrate has a low reflectance for light at the wavelength at which the wavelength selective reflection layer reflects light, and it is preferable that the substrate does not include a material that reflects light at the wavelength at which the wavelength selective reflection layer reflects light.

The substrate in the visible light region is preferably transparent. The substrate may be colored; however, it is preferable that the substrate is not colored or is colored to a low extent. Furthermore, it is preferable that the substrate has a refractive index of about 1.2 to 2.0, and more preferably about 1.4 to 1.8.

In a case where it is said in the present specification that an object is transparent, specifically, the non-polarized light transmittance (omnidirectional transmittance) at a wavelength of 380 to 780 nm may be 50% or higher, may be 70% or higher, and is preferably 85% or higher.

In addition, a haze value of the substrate is preferably 30% or lower, is more preferably 0.1% to 25%, and is particularly preferably 0.1% to 10%. Furthermore, by using a substrate with a high haze, such as an anti-glare (AG) substrate, it is possible to make transparency to deteriorate to improve front luminance and view angle characteristics.

A thickness of the substrate may be selected according to the applications and is not particularly limited. The thickness may be about 5 µm to 1,000 µm, and is preferably 10 µm to 250 µm, and is more preferably 15 µm to 150 µm.

The substrate may be single-layered or may be multilayered, and examples of the substrate in the case of being a single layer substrate include substrates formed of glass, triacetyl cellulose (TAC), polyethylene terephthalate (PET), polycarbonate, polyvinyl chloride, acryl, and a polyolefin. As an example of the substrate in the case of being a multilayered substrate, a substrate that has any one of the examples of the substrate in the case of being a single-layered substrate, as a support, and is provided with another layer on the surface of the support, may be mentioned.

The substrate may be provided with an underlayer between the substrate and the wavelength selective reflection layer. The underlayer is preferably a resin layer, and is particularly preferably a transparent resin layer. Examples of underlayers include a layer for adjusting surface energy optimum for forming a wavelength selective reflection layer, a layer for improving adhesion characteristics with a wavelength selective reflection layer, an alignment layer for adjusting the alignment of a polymerizable liquid crystal compound in forming a wavelength selective reflection layer, and the like.

In addition, it is preferable that the underlayer has a low reflectance for light at the wavelength at which the wavelength selective reflection layer reflects light, and it is preferable that the substrate does not include a material that reflects light at the wavelength at which the wavelength selective reflection layer reflects light. It is also preferable that the underlayer is transparent. Regarding the underlayer, it is preferable that the refractive index is preferably about 1.2 to 2.0, and more preferably about 1.4 to 1.8. It is also preferable that the underlayer is formed of a thermosetting resin or a photocurable resin, which is obtained by curing a composition that is directly applied on the support surface and includes a polymerizable compound. Examples of the polymerizable compound include non-liquid crystal compounds such as a (meth)acrylate monomer and a urethane monomer.

A thickness of the underlayer is not particularly limited, and the thickness is preferably 0.01 to 50 µm, and is more preferably 0.05 to 20 µm.

(Method for Manufacturing Modulation Region)

Examples of means to realize a decrease in reflectance of the modulation region includes a method in which a film thickness is reduced by controlling an application amount of the modulation region in a case where a wavelength selective reflection layer is a cholesteric liquid crystal layer and is a continuous film-like material, and a method in which a distribution density of dots in the modulation region is changed in a case where a wavelength selective reflection layer is a set of dots distributed discontinuously on the substrate.

As a method for changing the film thickness and the distribution density of the dots, it is possible to use various printing methods such as an inkjet method, spray application, and screen printing.

In addition, other examples thereof include a method for changing a ratio of a cholesteric phase of the modulation region to a phase other than the cholesteric phase, more specifically, a method in which the modulation region is ultraviolet-cured uniformly and is fixed after applying a temperature gradient to the modulation region to change a ratio of the cholesteric phase and the phase other than the cholesteric phase, and a method in which regions with different degrees of ultraviolet curing by pattern exposure using a mask such as halftone dots are provided in the modulation region, and thereafter, uniform heat treatment is performed to change a phase of a weakly cured part to a phase other than the cholesteric phase, and then fixing is performed. An isotropic phase is preferable as a phase other than the cholesteric phase.

Furthermore, other examples thereof include a method for changing a ratio of a visible light portion to a non-visible light portion with respect to a selective reflection wavelength of a cholesteric layer in the modulation region, and more specifically, a method in which a chiral agent is applied to the modulation region while changing an amount applied by means such as spray application, and a part of a region showing visible light selective reflectivity is changed to have infrared light selective reflectivity or ultraviolet light selective reflectivity.

<Transparent Screen System>

The transparent screen system of the embodiment of the present invention includes the transparent screen of the embodiment of the present invention and an image projection device. It is possible to use various known types of image projection devices including a liquid crystal projector, a reflective type liquid crystal projector, a laser projector, and the like.

It is also preferable to incorporate the transparent screen of the embodiment of the present invention into a windshield glass or the like to form a transparent screen system as a head-up display system.

EXAMPLES

Features of the present invention will be more specifically explained below by way of Examples. The materials, amounts used, proportions, treatments, treatment procedures, and the like disclosed in the following Examples can be modified as appropriate as long as the gist of the invention is maintained. The scope of the invention should not be limitedly interpreted by the specific examples described below.

Example 1

(Production of Underlayer)

A composition as described below was stirred and dissolved in a vessel that had been kept warm at 25° C., and thus an underlayer solution was prepared.

| Underlayer solution (parts by mass) | |
|---|---|
| Mixture of rod-like liquid crystal compounds described below | 100.0 |
| IRGACURE 819 (manufactured by BASF SE) | 3.0 |
| Compound A described below | 0.6 |
| Methyl ethyl ketone | 932.4 |

Rod-Like Liquid Crystal Compound

The numerical values are expressed in % by mass. R represents a group that is bonded to oxygen.

Compound A

The underlayer solution prepared as described above was applied on a transparent PET (polyethylene terephthalate, manufactured by Toyobo Co., Ltd., COSMOSHINE A4100) substrate which was rubbed in the longitudinal direction and has a thickness of 100 μm by using a bar coater #2.6. Thereafter, the substrate was heated so as to obtain a film surface temperature of 95° C., and the solution was dried for 30 seconds. Then, the underlayer solution was irradiated with ultraviolet radiation at a dose of 500 mJ/cm² using an ultraviolet irradiation device in an atmosphere purged with nitrogen at an oxygen concentration of 100 ppm or less, and a crosslinking reaction was carried out. Thus, an underlayer was produced.

(Formation of Cholesteric Liquid Crystal Dots)

A composition as described below was stirred and dissolved in a vessel that had been kept warm at 25° C., and thus a cholesteric liquid crystal ink solution Gm (liquid crystal composition) was prepared.

| Cholesteric liquid crystal ink solution Gm (parts by mass) | |
|---|---|
| Cyclopentanone | 139.6 |
| Mixture of rod-like liquid crystal compounds described below | 100.0 |
| IRGACURE 907 (manufactured by BASF SE) | 3.0 |
| KAYACURE DETX-S (manufactured by Nippon Kayaku Co., Ltd.) (2,4-diethylthioxanthone) | 1.0 |
| Chiral agent A having a structure described below | 5.63 |
| Surfactant having a structure described below | 0.08 |

Rod-Like Liquid Crystal Compound

The numerical values are expressed in % by mass. R represents a group that is bonded to oxygen.

Chiral Agent A

Surfactant

The cholesteric liquid crystal ink solution Gm is a material that forms dots capable of reflecting light having a center wavelength of 550 nm. In addition, the cholesteric liquid crystal ink solution Gm is a material that forms dots capable of reflecting right-handed circularly polarized light. In other words, the cholesteric liquid crystal ink solution Gm is a material that forms right-handed circularly polarized light green reflective dots.

A cholesteric liquid crystal ink solution Rm was prepared in the same manner as in the case of the cholesteric liquid crystal ink solution Gm, except that the amount of addition of the chiral agent A was changed to 4.70 parts by mass. In addition, a cholesteric liquid crystal ink solution Bm was prepared in the same manner as in the case of the cholesteric liquid crystal ink solution Gm, except that the amount of addition of the chiral agent A was changed to 7.02 parts by mass.

The cholesteric liquid crystal ink solution Rm is a material for forming right-handed circularly polarized light red reflective dots that reflect right-handed circularly polarized light having a center wavelength of 650 nm, and the cholesteric liquid crystal ink solution Bm is a material for forming right-handed circularly polarized light blue reflective dots that reflect right-handed circularly polarized light having a center wavelength of 450 nm.

(Creating Print Pattern 1)

A bitmap image of horizontal 1000 pixels×vertical 1000 pixels is created of which a left horizontal 400 pixels× vertical 1000 pixels was used as a black pixel area and a right horizontal 400 pixels×vertical 1000 pixels was used as a white pixel area, gradation is applied to a central horizontal 200 pixels×vertical 1000 pixels surrounded by the black pixel area and the white pixel area such that a black pixel density linearly decreases from the black pixel area toward the white pixel area, and therefore a bitmap image for print pattern was created. The bitmap image for print pattern is read by software for inkjet printer (DMP-2831, manufactured by FUJIFILM Dimatix, Inc.), 1 pixel was made to correspond to 100 microns, and therefore a print pattern 1 was created in which an overall sized was width×100 mm×length 100 mm, and a modulation region of width 20 mm×length 100 mm was present at the center thereof.

The cholesteric liquid crystal ink solution Rm prepared as described above was filled in a cartridge, and was added dropwise to create the print pattern on the underlayer produced above with an inkjet printer (DMP-2831, manufactured by FUJIFILM Dimatix, Inc.). The ink solution was dried for 10 minutes at 60° C. Thereafter, the ink solution was irradiated with ultraviolet radiation at a dose of 500 mJ/cm$^2$ at room temperature with an ultraviolet irradiation device, and was thereby cured to form a cholesteric liquid crystal layer R1 composed of red cholesteric liquid crystal dots.

Subsequently, overprinting was performed on the cholesteric liquid crystal layer R1 by using the cholesteric liquid crystal ink solution Gm with the above ink jet printer, and therefore a cholesteric liquid crystal layer G1 composed of green cholesteric liquid crystal dots was formed. Furthermore, overprinting was performed on the cholesteric liquid crystal layer G1 by using the cholesteric liquid crystal ink solution Bm with the above ink jet printer, and therefore a cholesteric liquid crystal layer B1 composed of blue cholesteric liquid crystal dots was formed. Therefore, a cholesteric liquid crystal layer R1G1B1 was obtained.

(Evaluation of Dot Shape and Cholesteric Structure)

Ten dots were randomly selected from among the dots of the transparent screen obtained as described above, and the shape of the dots was observed with a laser microscope (manufactured by Keyence Corporation). The dots had an average diameter of 30 μm and an average maximum height of 6 μm, and the angle formed at a contacting portion of both the dot surface at the dot edge and the underlayer surface (contact angle) was 44 degrees on the average. The height increased continuously in a direction extending from the dot edge toward the center.

One dot positioned at the center of the transparent screen obtained as described above was cut perpendicularly at a plane including the dot center, and the cross-section was observed with a scanning electron microscope. As a result, a striped pattern of bright parts and dark parts could be recognized inside the dot, and a cross-sectional view similar to FIG. 11 described in WO2016/133223A was obtained.

From the cross-sectional view, the angle formed by the direction of the normal line to a line that was formed by the first dark line as counted from the surface on the air interface side of the dot and the surface on the air interface side, was measured, and the angles at the dot edge, between the dot edge and the center, and at the dot center were 90 degrees, 89 degrees, and 90 degrees, respectively.

(Formation of Overcoat Layer)

A composition as described below was stirred and dissolved in a vessel that had been kept warm at 25° C., and thus an application solution for overcoating was prepared.

| Application solution for overcoating (parts by mass) | |
|---|---|
| Methyl ethyl ketone | 103.5 |
| KAYARAD DPCA-30 (manufactured by Nippon Kayaku Co., Ltd.) | 30.0 |
| Compound L described below | 45.0 |
| OGSOL EA-0200 (manufactured by Osaka Gas Chemicals Co., Ltd.) (Refractive index modifier) | 25.0 |
| Compound A described below | 0.5 |
| IRGACURE 127 (manufactured by BASF SE) | 3.0 |

Compound L

Compound A

The application solution for overcoating prepared above was applied onto the cholesteric liquid crystal layer R1G1B1 formed of cholesteric liquid crystal dots by using a bar coater of #18. Subsequently, the entire surface of the substrate was heated so as to obtain a film surface temperature of 50° C., and the coating liquid was dried for 60 seconds. Then, the entire surface was irradiated with ultraviolet radiation at a dose of 500 mJ/cm$^2$ using an ultraviolet irradiation device, and a crosslinking reaction was carried out to form an overcoat layer. Therefore, an optical sheet 1 was obtained.

Comparative Example 2

(Creating Print Pattern 2)

In the same manner as Example 1, a bitmap image of horizontal 1000 pixels×vertical 1000 pixels is created of which a left horizontal 475 pixels×vertical 1000 pixels was used as a black pixel area and a right horizontal 475 pixels×vertical 1000 pixels was used as a white pixel area, gradation is applied to a central horizontal 50 pixels×vertical 1000 pixels surrounded by the black pixel area and the white pixel area such that a black pixel density linearly decreases from the black pixel area toward the white pixel area, and therefore a bitmap image for print pattern was created. The bitmap image for print pattern is read by software for inkjet printer (DMP-2831, manufactured by FUJIFILM Dimatix, Inc.), 1 pixel was made to correspond to 100 microns, and therefore a print pattern 2 was created in which an overall sized was width 100 mm×length 100 mm, and a modulation region of width 5 mm×length 100 mm was present at the center thereof.

An optical sheet 2 was produced in the same manner as in Example 1 except that the print pattern was changed to the print pattern 2.

Example 3

The cholesteric liquid crystal ink solution Rm was applied on an underlayer of width 100 mm×length 100 mm produced in the same manner as in Example 1 by using a spray application device to form a uniformly coated region with a coating volume of 3.8 mL/m$^2$ in the left side region of width 40 mm×length 100 mm. The application was performed in width 20 mm×length 100 mm adjacent to the uniformly coated region such that an amount of application decreased linearly toward the unapplied region on the right side. Drying was performed for 10 minutes at 60° C. Thereafter, the ink solution was irradiated with ultraviolet radiation at a dose of 500 mJ/cm$^2$ at room temperature with an ultraviolet irradiation device, and was thereby cured to form a cholesteric liquid crystal layer R3.

Subsequently, application was performed on the cholesteric liquid crystal layer R3 in the same pattern as that of the cholesteric liquid crystal layer R3 by using the cholesteric liquid crystal ink solution Gm, and therefore a cholesteric liquid crystal layer G3 was produced. Furthermore, application was performed on the cholesteric liquid crystal layer G3 in the same pattern as that of the cholesteric liquid crystal layer R3 by using the cholesteric liquid crystal ink solution Bm, and therefore a cholesteric liquid crystal layer B3 was produced. Therefore, a cholesteric liquid crystal layer R3G3B3 was obtained.

In the same manner as in Example 1, the application solution for overcoating prepared above was applied onto the cholesteric liquid crystal layer R3G3B3 formed of cholesteric liquid crystal dots by using a bar coater of #18. Subsequently, the entire surface of the substrate was heated so as to obtain a film surface temperature of 50° C., and the coating liquid was dried for 60 seconds. Then, the entire surface was irradiated with ultraviolet radiation at a dose of 500 mJ/cm$^2$ using an ultraviolet irradiation device, and a crosslinking reaction was carried out to form an overcoat layer. Therefore, an optical sheet 3 was obtained.

Example 4

(Formation of Alignment Film)

A commercially available cellulose triacylate film (Fuji TAC TG 40, manufactured by Fuji Film Co., Ltd.) was used as a substrate, and an alignment film solution having the following composition was continuously coated with a wire bar of #14. The solution was dried with warm air at 60° C. for 60 seconds, and further dried with warm air at 100° C. for 120 seconds. Rubbing treatment was continuously performed on the obtained coated film. At this time, a longitudinal direction of the elongated film is parallel to a transport direction, and a rubbing direction is parallel to the transport direction.

| Composition of alignment film coating solution | |
|---|---|
| Modified polyvinyl alcohol described below | 10 parts by mass |
| Water | 371 parts of mass |
| Methanol | 119 parts by mass |
| Glutaraldehyde | 0.5 parts by mass |
| Photopolymerization initiator (IRGACURE 2959, manufactured by BASF SE) | 0.3 part by mass |

(in the following structural formula, a proportion is a mol ratio)

Modified Polyvinyl Alcohol (Preparation of Cholesteric Liquid Crystal Coating Solution)

A composition as described below was stirred and dissolved in a vessel that had been kept warm at 25° C., and thus a cholesteric liquid crystal coating solution G (liquid crystal composition) was prepared.

| Cholesteric liquid crystal coating solution G (parts by mass) | |
|---|---|
| Mixture of rod-like liquid crystal compounds described below | 100.0 |
| A-TMMT (manufactured by Shin-Nakamura Chemical Co., Ltd.) | 2.0 |
| IRGACURE 819 (manufactured by BASF SE) | 6.0 |
| Chiral agent A having a structure described below | 6.2 |
| Surfactant having a structure described below | 0.08 |
| Methyl ethyl ketone | 279.8 |

Rod-Like Liquid Crystal Compound

The numerical values are expressed in % by mass. R represents a group that is bonded to oxygen.

Chiral Agent A

Surfactant

The cholesteric liquid crystal coating solution G is a material that forms a cholesteric liquid crystal layer capable of reflecting light having a center wavelength of 550 nm. In addition, the cholesteric liquid crystal coating solution G is a material that forms dots capable of reflecting right-handed circularly polarized light. In other words, the cholesteric liquid crystal coating solution G is a material that forms a right-handed circularly polarized light green reflective cholesteric liquid crystal layer.

A cholesteric liquid crystal coating solution R was prepared in the same manner as the case of the cholesteric liquid crystal coating solution G, except that 5.2 parts by mass of the chiral agent A and 277.3 parts by mass of methyl ethyl ketone were used. In addition, a cholesteric liquid crystal coating solution B was prepared in the same manner as the case of the cholesteric liquid crystal coating solution G, except that the amount of addition of the chiral agent A was changed to 7.2 parts by mass.

The cholesteric liquid crystal coating solution R is a material for forming a right-handed circularly polarized light red reflective cholesteric liquid crystal layer that reflects right-handed circularly polarized light having a center wavelength of 650 nm, and the cholesteric liquid crystal coating solution B is a material for forming a right-handed circularly polarized light blue reflective cholesteric liquid crystal layer that reflects right-handed circularly polarized light having a center wavelength of 450 nm.

The cholesteric liquid crystal coating solution G prepared above was applied by using a bar coater of #10 onto the alignment film prepared above which had been subjected to the rubbing treatment. Thereafter, a film surface was heated at a temperature of 95° C. for 60 seconds to accelerate the alignment of the cholesteric liquid crystal, and therefore an uncured cholesteric liquid crystal layer film was produced.

(Preparation of Pattern 1 for Mask Exposure)

An image for a printing pattern was printed on an OHP sheet of width 100 mm×length 100 mm, the printing pattern having a modulation region of width 20 mm×length 100 mm in which width 40 mm×length 100 mm on the left side is a white pixel area, width 40 mm×length 100 mm on the right side is a black pixel area, and a black pixel density is set to increase linearly from the white pixel area toward the black pixel area in the center portion between the white pixel area and the black pixel area. Therefore, a pattern 1 for mask exposure was created. In the pattern 1 for mask exposure, a portion in which white pixels were printed was a transparent region, and a portion in which black pixels were printed was an opaque region, which functions as a mask.

The uncured cholesteric liquid crystal coated film was irradiated with ultraviolet light of 200 mJ/cm² at room temperature through the pattern 1 for mask exposure by using a mask exposure machine M-2LF (manufactured by Mikasa Co., Ltd.), and therefore a region corresponding to the transparent region of the mask was cured.

The entire surface of the mask-exposed sample was heated to 130° C. with a hot plate. A phase of the cholesteric liquid crystal in the region corresponding to the opaque region of the mask which had not been cured by mask expose was moved to an isotropic phase. The entire surface was irradiated with ultraviolet light of 500 mJ/cm² and cured while maintaining a phase of the region in the isotropic phase, and therefore a cholesteric liquid crystal layer film G4 was obtained.

A cholesteric liquid crystal layer film R4 was produced in the same process as that of the film G4 except that the cholesteric liquid crystal coating solution R was used. In the same manner, a cholesteric liquid crystal layer film B4 was produced using the cholesteric liquid crystal coating solution B.

Subsequently, respective substrates are bonded so that the patterns overlap each other in the order of cholesteric liquid crystal layer film R4, cholesteric liquid crystal layer film G4, and cholesteric liquid crystal layer film B4 from bottom to top while respective substrate sides face down, by using gluing agent SK2057 (manufactured by SOKEN CHEMICAL CO., LTD.), and therefore an optical sheet 4 was obtained.

Example 5

(Preparation of Pattern 2 for Mask Exposure)

An image for a printing pattern was printed on an OHP sheet of width 100 mm×length 100 mm, the printing pattern in which width 40 mm×length 100 mm on the left side is a white pixel area, width 40 mm×length 100 mm on the right side is a black pixel area, and dots of 250 microns were disposed to linearly increase a density of the halftone dots from the white pixel area toward the black pixel area in the center portion of width 20 mm×length 100 mm surrounded by the white pixel area and the black pixel area. Therefore, a pattern 2 for mask exposure was created. In the pattern 2 for mask exposure, a portion in which white pixels were printed was a transparent region, and a portion in which black pixels were printed was an opaque region, which functions as a mask.

An optical sheet 5 was obtained in the same manner as in Example 4 except that a pattern for mask exposure was changed from the pattern 1 for mask exposure to the pattern 2 for mask exposure.

Example 6

In the same manner as in Example 4, the cholesteric liquid crystal coating solution G was applied by using a bar coater of #10 onto the alignment film which had been subjected to the rubbing treatment. Thereafter, a film surface was heated at a temperature of 95° C. for 60 seconds to accelerate the alignment of the cholesteric liquid crystal, and therefore an uncured cholesteric liquid crystal layer film of width 100 mm×length 100 mm was produced.

A region 1 of width 40 mm×length 100 mm on the left side of the uncured cholesteric liquid crystal layer film was heated at 95° C., a region 2 of width 40 mm×length 100 mm on the right side thereof was heated at 130° C., and a region of width 20 mm×length 100 mm between the region 1 and the region 2 was heated for 60 seconds so that a temperature increases continuously from the region 1 to the region 2. These regions were irradiated with ultraviolet light of 500 mJ/cm$^2$ and cured while maintaining the above-mentioned temperature, and therefore a cholesteric liquid crystal layer film G6 was obtained.

A cholesteric liquid crystal layer film R6 was produced in the same process as that of the G6 described above except that the cholesteric liquid crystal coating solution R was used. In the same manner, a cholesteric liquid crystal layer film B6 was produced using the cholesteric liquid crystal coating solution B.

Subsequently, respective substrates are bonded so that the patterns overlap each other in the order of cholesteric liquid crystal layer film R6, cholesteric liquid crystal layer film G6, and cholesteric liquid crystal layer film B6 from bottom to top while respective substrate sides face down, by using gluing agent SK2057 (manufactured by SOKEN CHEMICAL CO., LTD.), and therefore an optical sheet 6 was obtained.

Example 7

| (Preparation of left chiral agent solution) Left chiral agent solution (parts by mass) | |
|---|---|
| Cyclopentanone | 90.0 |
| Chiral agent B having a structure described below | 10.0 |

Chiral Agent B

In the same manner as in Example 4, the cholesteric liquid crystal coating solution G was applied by using a bar coater of #10 onto the alignment film which had been subjected to the rubbing treatment. Thereafter, a film surface was heated at a temperature of 95° C. for 60 seconds to accelerate the alignment of the cholesteric liquid crystal, and therefore an uncured cholesteric liquid crystal layer film of width 100 mm×length 100 mm was produced.

The left chiral agent solution was uniformly spray-applied at an application amount of 2.7 mL/m$^2$ on the region 2 of width 40 mm×length 100 mm on the right side of the uncured cholesteric liquid crystal layer film by using a spray application device. The region 2 becomes transparent because a twisting force between the chiral agent A contained in the cholesteric liquid crystal coated with a bar coater, and the chiral agent B contained in the left chiral agent solution applied by spray application is offset, and therefore a selective reflection wavelength becomes an infrared region.

In the region of width 20 mm×length 100 mm adjacent to the region 2 to which spray application was uniformly performed, spray application was further performed such that an amount of application decreased continuously toward the region 1 of width 40 mm×length 100 mm on the left side. After drying at 95° C. for 60 seconds, the entire surface was irradiated with ultraviolet radiation at a dose of 500 mJ/cm$^2$ at room temperature with an ultraviolet irradiation device, and was thereby cured to form a cholesteric liquid crystal layer film G7.

A cholesteric liquid crystal layer film R7 was produced in the same process as that of the film G7 except that the cholesteric liquid crystal coating solution R was used. In the same manner, a cholesteric liquid crystal layer film B7 was produced using the cholesteric liquid crystal coating solution B.

Subsequently, respective substrates are bonded so that the patterns overlap each other in the order of cholesteric liquid crystal layer film R7, cholesteric liquid crystal layer film G7, and cholesteric liquid crystal layer film B7 from bottom to top while respective substrate sides face down, by using gluing agent SK2057 (manufactured by SOKEN CHEMICAL CO., LTD.), and therefore an optical sheet 7 was obtained.

Example 8

| (Preparation of right chiral agent solution) Right chiral agent solution (parts by mass) | |
|---|---|
| Cyclopentanone | 90.0 |
| Chiral agent A having a structure described below | 10.0 |

Chiral Agent A

In the same manner as in Example 4, the cholesteric liquid crystal coating solution G was applied by using a bar coater of #10 onto the alignment film which had been subjected to the rubbing treatment. Thereafter, a film surface was heated at a temperature of 95° C. for 60 seconds to accelerate the alignment of the cholesteric liquid crystal, and therefore an uncured cholesteric liquid crystal layer film of width 100 mm×length 100 mm was produced.

The right chiral agent solution was uniformly spray-applied at an application amount of 2.2 mL/m² on the region 2 of width 40 mm×length 100 mm on the right side of the uncured cholesteric liquid crystal layer film by using a spray application device. The region 2 becomes transparent because a twisting force between the chiral agent A contained in the cholesteric liquid crystal coated with a bar coater, and the chiral agent A contained in the right chiral agent solution applied by spray application is added together, and therefore a selective reflection wavelength becomes an ultraviolet region.

In the region of width 20 mm×length 100 mm adjacent to the region 2 to which spray application was uniformly performed, spray application was further performed such that an amount of application decreased continuously toward the region 1 of width 40 mm×length 100 mm on the left side. After drying at 95° C. for 60 seconds, the entire surface was irradiated with ultraviolet radiation at a dose of 500 mJ/cm² at room temperature with an ultraviolet irradiation device, and was thereby cured to form a cholesteric liquid crystal layer film G8.

A cholesteric liquid crystal layer film R8 was produced in the same process as that of the G6 described above except that the cholesteric liquid crystal coating solution R was used. In the same manner, a cholesteric liquid crystal layer film B8 was produced using the cholesteric liquid crystal coating solution B.

Subsequently, respective substrates are bonded so that the patterns overlap each other in the order of cholesteric liquid crystal layer film R8, cholesteric liquid crystal layer film G8, and cholesteric liquid crystal layer film B8 from bottom to top from a support while respective substrate sides face down, by using gluing agent SK2057 (manufactured by SOKEN CHEMICAL CO., LTD.), and therefore an optical sheet 8 was obtained.

Comparative Example

The cholesteric liquid crystal coating solution G prepared in the same manner as in Example 4 was applied by using a #10 bar coater on an alignment film of width 100 mm×length 100 mm which had been subjected to rubbing treatment and which was prepared in the same manner as in Example 4 such that only the region 1 of width 40 mm×height 100 mm was coated by covering regions of width 60 mm×height 100 mm other than the region 1 with a PET film. Thereafter, a film surface was heated at a temperature of 95° C. for 60 seconds to accelerate the alignment of the cholesteric liquid crystal, the entire surface was irradiated with ultraviolet light of 500 mJ/cm² at room temperature by an ultraviolet irradiation device to be cured, and therefore a cholesteric liquid crystal layer film G9 was produced.

A cholesteric liquid crystal layer film R9 was produced in the same process as that of the G6 described above except that the cholesteric liquid crystal coating solution R was used. In the same manner, a cholesteric liquid crystal layer film B9 was produced using the cholesteric liquid crystal coating solution B.

Subsequently, respective substrates are bonded so that the region 1 overlaps in the order of cholesteric liquid crystal layer film R9, cholesteric liquid crystal layer film G9, and cholesteric liquid crystal layer film B9 from bottom to top from a support while respective substrate sides face down, by using gluing agent SK2057 (manufactured by SOKEN CHEMICAL CO., LTD.), and therefore an optical sheet 9 was obtained.

(Evaluation Method)

As an evaluation, a spectrometer (HR4000 manufactured by Ocean Optics, Inc.) was brought into contact with an optical microscope (ECLIPSE E600POL manufactured by NIKON), a reflectance was measured every 1 mm by shifting in a lateral direction at a position of 50 mm in length on a film of width 100 mm×length 100 mm, and the shortest distance between an imaginary contour line and the uniform region, and changes from the uniform region to the imaginary contour line were evaluated.

Regarding measurement of the reflectance, a diameter of a field of view was 5 mm, and a reflectance was obtained by multiplying the obtained reflectance spectrum by a weighting function of the CIE 1931 2° standard colorimetric observer and integrating it to calculate a tristimulus value Y, and then dividing it by a tristimulus value Y of the complete diffuser plate measured and calculated in the same manner.

In addition, changes in reflectance every 1 mm, that is, a case in which $Rn-Rn+1$ (n is an integer greater than 0) was 0% to 5% was perceived as a monotonous decrease. At this time, a reflectance R0 (n=0) of the start point was an end portion of the uniform region close to the modulation region, and a reflectance Rt (n+1=t) of the end point was an outside of the imaginary contour line close to the modulation region.

The invisibility of the contour was sensory evaluated according to the following criteria.

A: A contour was not visible
B: A contour was slightly visible
C: A contour was visible The details of the configuration and the evaluation results are shown in Table 1.

TABLE 1

| | | Example 1 | Example 2 | Example 3 | Example 4 | Example 5 | Example 6 | Example 7 | Example 8 | Comparative Example 2 |
|---|---|---|---|---|---|---|---|---|---|---|
| Modulation region | Production method | Inkjet | Inkjet | Spray application | Mask exposure | Mask exposure | Heating | Spray application | Spray application | — |
| | Modulation region means | Density of dots | Density of dots | Density of dots | Light exposure gradient (concentration) | Light exposure gradient (halftone dots) | Temperature gradient | Concentration gradient of left chiral agent | Concentration gradient of right chiral agent | — |

TABLE 1-continued

|  | Example 1 | Example 2 | Example 3 | Example 4 | Example 5 | Example 6 | Example 7 | Example 8 | Comparative Example 2 |
|---|---|---|---|---|---|---|---|---|---|
| Shortest distance between imaginary contour line and uniform region | 20 mm | 5 mm | 20 mm | 20 mm | 20 mm | 20 mm | 20 mm | 20 mm | 0 mm |
| Changes from uniform region to imaginary contour line | Monotonous decrease | Monotonous decrease | Monotonous decrease | Monotonous decrease | Monotonous decrease | Monotonous decrease | Monotonous decrease | Monotonous decrease | Non-monotonous decrease |
| Invisibility of contour | A | B | A | A | A | A | A | A | C |

EXPLANATION OF REFERENCES

1: substrate
2: selective reflection layer
10: transparent screen
100: uniform region
101: modulation region
102: transparent region
103: imaginary contour line

What is claimed is:

1. A transparent screen comprising:
a substrate; and
a cholesteric liquid crystal layer on the substrate,
wherein the entire cholesteric liquid crystal layer is surrounded by an imaginary contour line,
the cholesteric liquid crystal layer has a uniform region and a modulation region that is located between the uniform region and at least a part of the imaginary contour line,
a distance between the imaginary contour line and the uniform region is 10 mm or longer, and
a reflectance of the modulation region monotonously decreases from a uniform region side toward an imaginary contour line side,
wherein the uniform region and the modulation region have the cholesteric liquid crystal layer on the entire surface thereof, and
in the modulation region, a film thickness is reduced in a decrease direction of the reflectance.

2. A transparent screen comprising:
a substrate; and
a cholesteric liquid crystal layer on the substrate,
wherein the entire cholesteric liquid crystal layer is surrounded by an imaginary contour line,
the cholesteric liquid crystal layer has a uniform region and a modulation region that is located between the uniform region and at least a part of the imaginary contour line,
a distance between the imaginary contour line and the uniform region is 10 mm or longer, and
a reflectance of the modulation region monotonously decreases from an uniform region side toward an imaginary contour line side,
wherein the uniform region has the cholesteric liquid crystal layer on the entire surface thereof,
the modulation region includes a liquid crystalline compound,
the liquid crystalline compound has, in a pattern shape, portions that are fixed in a cholesteric phase and portions that are fixed in a phase other than the cholesteric phase, and
a proportion of the portions that are fixed in a phase other than the cholesteric phase increases in a decrease direction of the reflectance.

3. A transparent screen comprising:
a substrate; and
a cholesteric liquid crystal layer on the substrate,
wherein the entire cholesteric liquid crystal layer is surrounded by an imaginary contour line,
the cholesteric liquid crystal layer has a uniform region and a modulation region that is located between the uniform region and at least a part of the imaginary contour line,
a distance between the imaginary contour line and the uniform region is 10 mm or longer, and
a reflectance of the modulation region monotonously decreases from an uniform region side toward an imaginary contour line side,
wherein the uniform region and the modulation region have the cholesteric liquid crystal layer on the entire surface thereof, and
in the modulation region, a chiral pitch of the cholesteric liquid crystal layer increases in a decrease direction of the reflectance.

4. A transparent screen comprising:
a substrate; and
a cholesteric liquid crystal layer on the substrate,
wherein the entire cholesteric liquid crystal layer is surrounded by an imaginary contour line,
the cholesteric liquid crystal layer has a uniform region and a modulation region that is located between the uniform region and at least a part of the imaginary contour line,
a distance between the imaginary contour line and the uniform region is 10 mm or longer, and
a reflectance of the modulation region monotonously decreases from an uniform region side toward an imaginary contour line side,
wherein the uniform region and the modulation region have the cholesteric liquid crystal layer on the entire surface thereof, and
in the modulation region, a chiral pitch of the cholesteric liquid crystal layer decreases in a decrease direction of the reflectance.

* * * * *